United States Patent [19]

Snyder

[11] Patent Number: 5,346,247
[45] Date of Patent: Sep. 13, 1994

[54] TRUCK AIR RIDE SUSPENSION

[75] Inventor: Gary A. Snyder, Marionville, Mo.

[73] Assignee: Reyco Industries, Inc., Springfield, Mo.

[21] Appl. No.: 61,668

[22] Filed: May 14, 1993

[51] Int. Cl.$^5$ .......................... B60G 9/02; B60G 11/46
[52] U.S. Cl. .................................. 280/712; 280/720; 267/31; 267/47
[58] Field of Search ............... 280/712, 713, 720, 725, 280/688; 267/47, 31, 36.1, 148

[56] References Cited

U.S. PATENT DOCUMENTS

| | | |
|---|---|---|
| 3,785,673 | 1/1974 | Harbers, Jr. et al. ............... 280/712 |
| 3,833,236 | 9/1974 | Davis et al. . |
| 4,033,606 | 7/1977 | Ward et al. . |
| 4,705,294 | 11/1987 | Raidel .................................. 267/31 |
| 4,858,949 | 8/1989 | Wallace et al. ..................... 280/713 |
| 4,923,210 | 5/1990 | Heider et al. ....................... 280/712 |
| 4,946,190 | 8/1990 | Buttner ................................ 280/712 |
| 5,203,585 | 4/1993 | Pierce ................................... 280/713 |

OTHER PUBLICATIONS

Reyco Industries, Inc. Brochure, "Rey Air Tractor Air Suspension Model 102AR" Publ. Apr. 1992.

Primary Examiner—Margaret A. Focarino
Assistant Examiner—Peter English
Attorney, Agent, or Firm—Dorn, McEachran, Jambor & Keating

[57] ABSTRACT

A suspension for a vehicle having a rear axle beneath the frame of the vehicle. An elongated gooseneck spring includes a center portion, an upwardly inclined front portion and a lower trailing rear portion. The front portion of the spring operatively engages a front hanger mounted on the frame. The spring is clamped to the rear axle at the center portion of the spring. An air spring is mounted on the lower trailing rear portion of the spring and is also attached to the frame. A shock absorber is located between the rear axle and the air spring and is operatively connected between the frame and the rear axle. The lower trailing rear portion of the gooseneck spring extends inwardly under the frame. The gooseneck spring is formed with a downwardly and inwardly twisted portion between its center portion and its lower trailing rear portion.

3 Claims, 4 Drawing Sheets

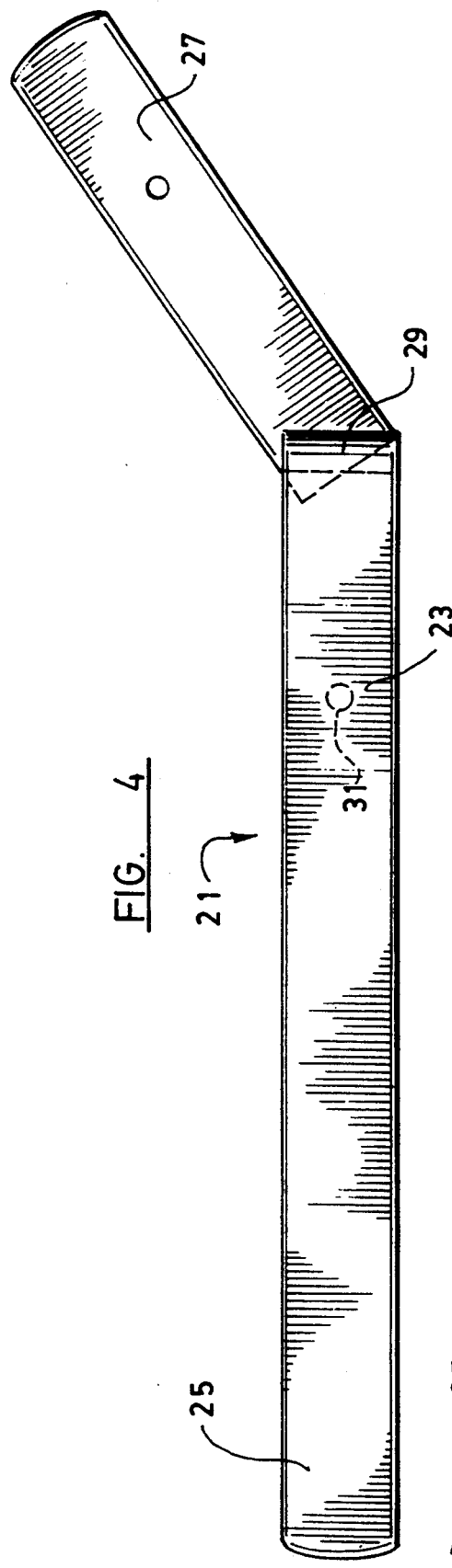
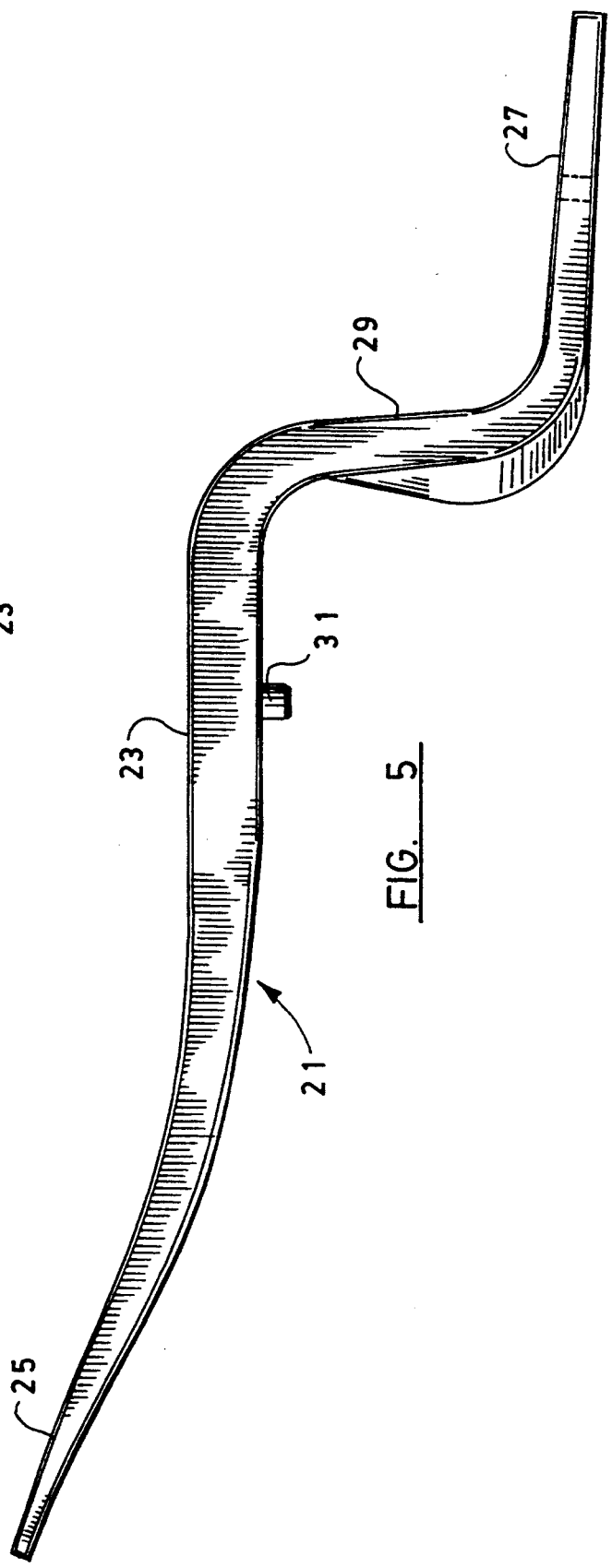

TRUCK AIR RIDE SUSPENSION

BACKGROUND OF THE INVENTION

This invention is directed to an "air ride" suspension for a truck, a tractor, or a trailer, which suspension reduces the tare weight of the vehicle so that a greater payload can be carried by the vehicle under existing highway weight restrictions.

An object of this invention is a spring for an "air ride" suspension which directly engages an air bag spring eliminating the need for and the weight of a separate air bag spring support.

Another object of this invention is an "air ride" suspension in which an air bag spring is supported on a gooseneck spring and a shock absorber is directly connected between the vehicle frame and the vehicle axle in a location forward of the air bag spring.

Another object of this invention is a "air ride" suspension having a front mount which attaches to the frame of a tractor on the lower portion thereof where it is clear of the tractor fifth wheel.

Other objects of the invention will be found in the following specification, claims and drawings.

BRIEF DESCRIPTION OF THE DRAWINGS

FIG. 4 is a top plan view of the spring which is part of the air suspension of this invention; and FIG. 5 is a side elevational view of the spring of FIG. 4.

DESCRIPTION OF THE PREFERRED EMBODIMENT

Figure 1:
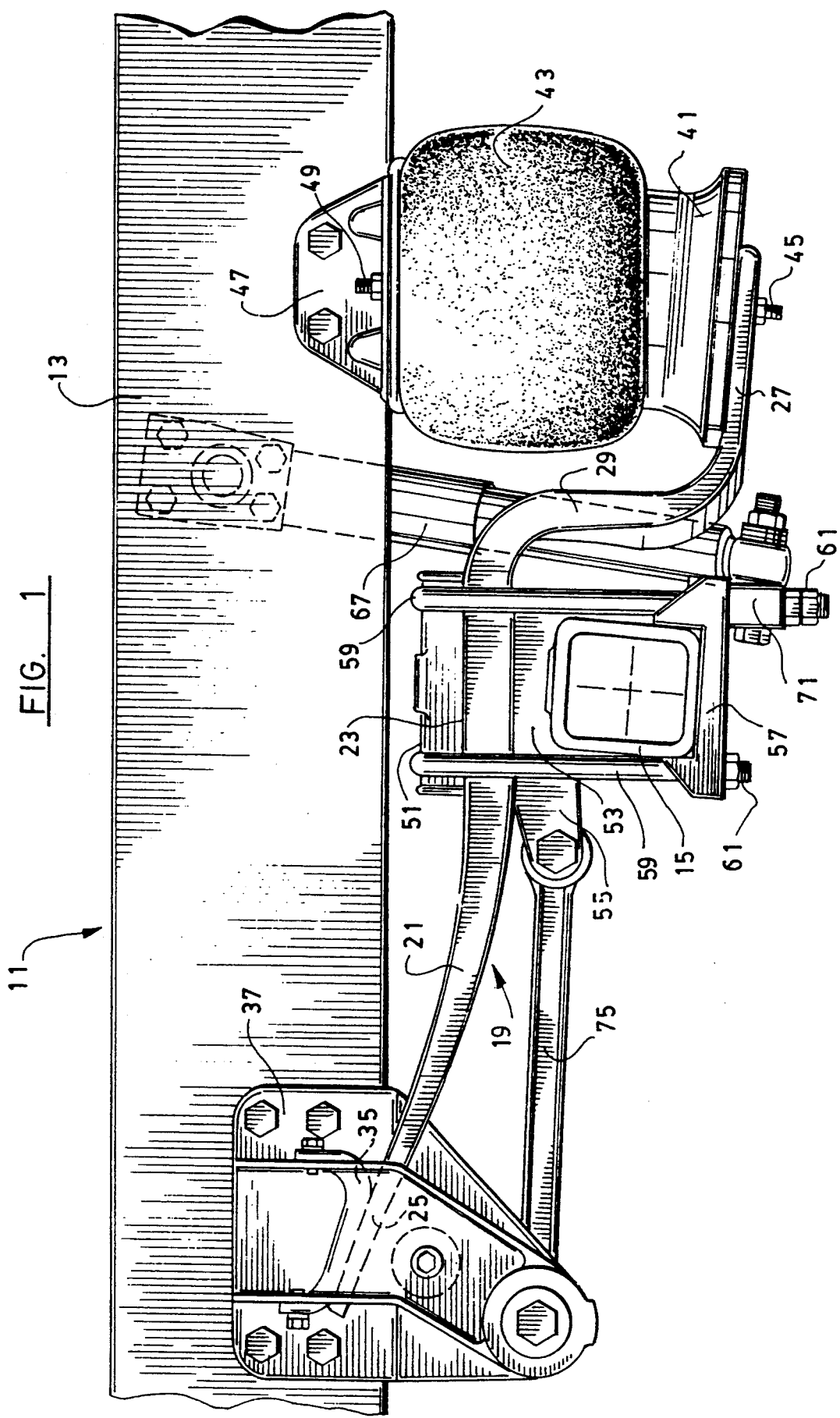
FIG. 1 is a partial side elevational view of the left hand side of a vehicle frame showing the "air ride" suspension of this invention.

FIG. 1 of the drawings shows a portion of a frame 11 of a vehicle embodying the novel "air ride" suspension of this invention. Specifically, the portion of the frame shown is the left hand, channel-shaped side beam 13 of the frame which is located above and carried by an axle 15. Interposed between the beam 13 and the axle 15 is the air ride suspension 19 of this invention. This suspension includes a gooseneck spring 21 having a center section 23 clamped to the axle 15 in a manner to be hereinafter described, an upwardly inclined front portion 25, a lower rear portion 27 and a vertical portion 29 that is inwardly twisted as shown most clearly in FIGS. 4 and 5 of the drawings. A downwardly projecting cylindrical stud 31 is mounted on the undersurface of the center section 23 of the spring as shown in FIGS. 2, 4 and 5.

The upwardly inclined front portion 25 of the gooseneck spring 21 bears against a plastic pad 35 attached to the upper end of a spring hanger 37 which is mounted on the beam 13 forwardly of the axle 15 as viewed in FIG. 1 of the drawings. The plastic pad 35 is preferably formed of an ultra-high molecular weight polyethylene to provide a low friction engagement with the front portion 25 of the spring 21.

Figure 2:
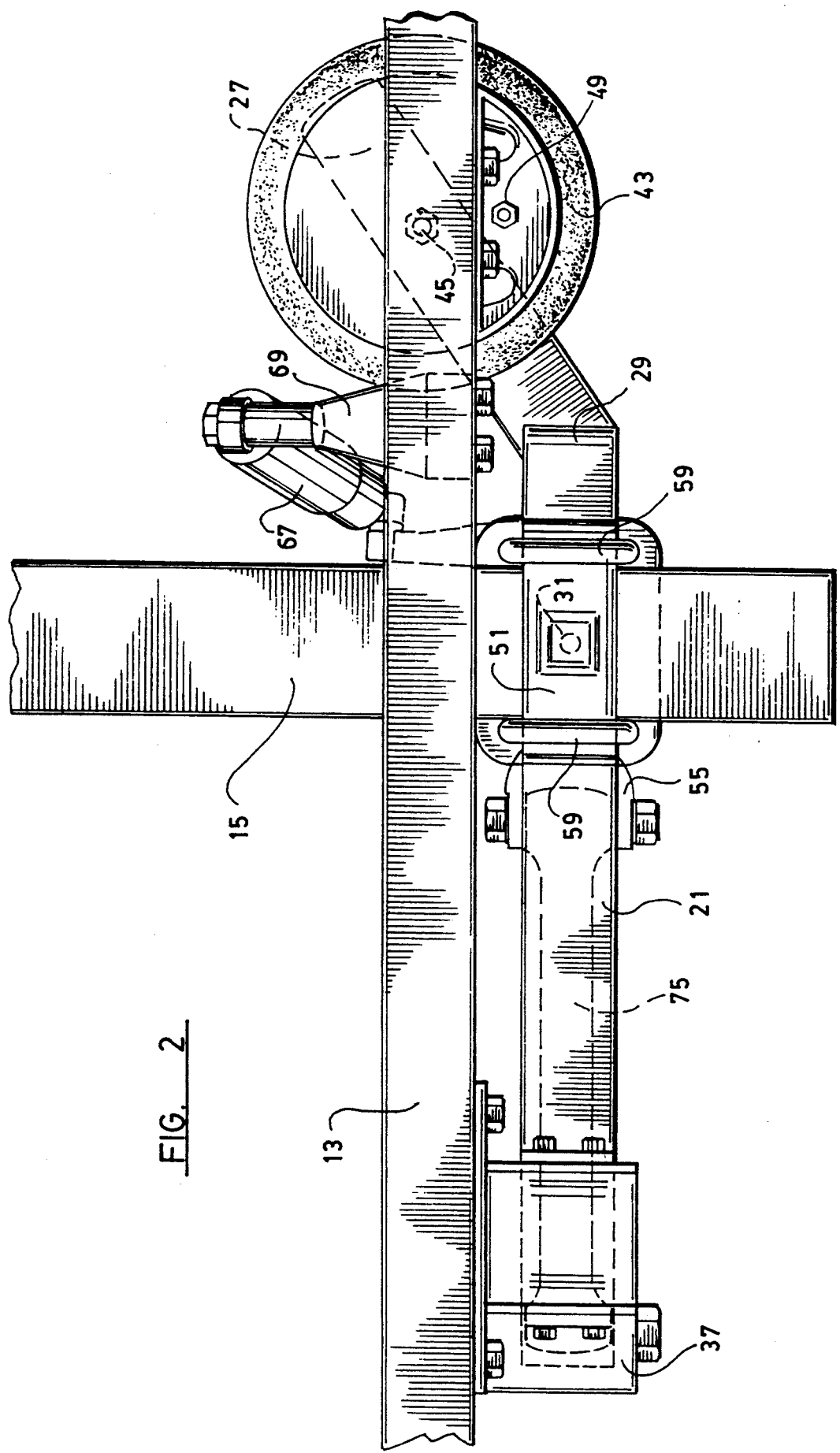
FIG. 2 is a partial top plan view of the vehicle frame and suspension of FIG. 1.
Figure 3:
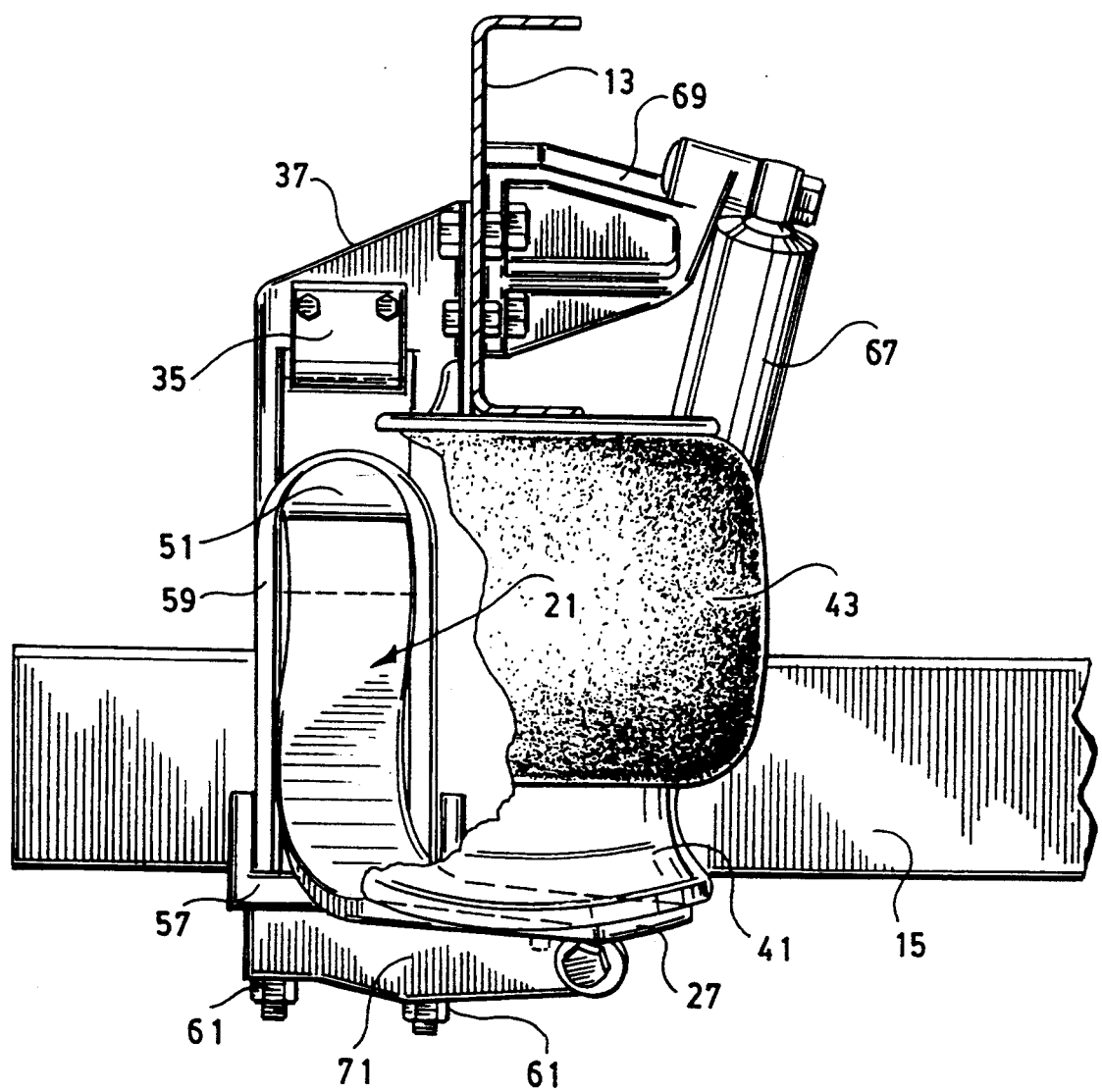
FIG. 3 is a partial end elevational view of the vehicle frame of FIG. 1 with portions of some parts broken away.

The lower base 41 of an air bag spring 43 is supported on and bolted to the lower rear portion 27 of the gooseneck spring 21 as shown in FIGS. 1, 2, and 3 of the drawings. The bolted connection of the base 41 by threaded fastener 45 is positioned under the side beam 13 as can be most clearly seen in FIG. 2 of the drawings. A bracket 47 mounted on the outer surface of the side beam 13 is bolted to the top of the air bag spring 43 by a threaded fastener 49.

A top plate 51 rests on and engages the top surface of the center section 23 of the gooseneck spring 21. The lower surface of the center section of the spring engages an axle seat 53 which in turn rests on the top of the axle 15 which is tilted slightly rearwardly of the vertical. The cylindrical stud 31 depending from the spring 21 seats in a socket (not shown) in the top surface of the axle seat 53. A fowardly extending yoke arm 55 is formed integrally with the axle seat 53. A bottom plate 57 engages the lower portion of the axle 15 with the top plate, bottom plate, and axle seat clamped to the center section of the spring 23 by U-bolts 59. The U-bolts are tightened by self-locking nuts 61 which engage the threaded lower ends of the U-bolts.

A shock absorber 67 extends between the beam 13 and the axle 15 inclined both transversely and longitudinally relative to the vehicle. The upper end of the shock absorber is attached to a bracket 69 mounted on the inside surface of the beam 13 while the lower end of the shock absorber is connected to a lower bracket 71 which is held against the axle bottom plate 57 by the self-locking nut 61 attached to a U-bolt 59.

A rigid torque arm 75 connects between the yoke arm 55 of the axle seat 53 and the front spring hanger 37.

I claim:

1. A suspension for a vehicle having a rear axle beneath a frame thereof,
   - an elongated gooseneck spring having a center portion, an upwardly inclined front portion and a lower trailing rear portion extending inwardly under said frame, said front portion of said spring operatively engaging a front hanger mounted on said frame,
   - means clamping said spring to said rear axle at said center portion of said spring, and
   - an air spring mounted on said lower trailing rear portion of said spring and attached to said frame.

2. The suspension of claim 1 in which said gooseneck spring has a downwardly and inwardly twisted portion between said center portion and said lower trailing rear portion.

3. The suspension of claim 1 in which a shock absorber connects said frame and said rear axle and is positioned between said rear axle and said air spring.

* * * * *